United States Patent
Sityon et al.

(10) Patent No.: US 8,392,393 B2
(45) Date of Patent: Mar. 5, 2013

(54) GRAPH SEARCHING

(75) Inventors: Arik Sityon, Petach Tiqwa (IL); Uri Ben-Dor, Givat Shmuel (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 318 days.

(21) Appl. No.: 12/704,770

(22) Filed: Feb. 12, 2010

(65) Prior Publication Data

US 2011/0202511 A1 Aug. 18, 2011

(51) Int. Cl.
G06F 17/30 (2006.01)
(52) U.S. Cl. .......................... 707/706; 707/769
(58) Field of Classification Search .................. 707/705, 707/706, 758, 769, 798
See application file for complete search history.

(56) References Cited

U.S. PATENT DOCUMENTS

| | | | |
|---|---|---|---|
| 6,772,148 B2 * | 8/2004 | Baclawski | 1/1 |
| 7,822,785 B2 * | 10/2010 | Ayachitula et al. | 707/804 |
| 7,844,595 B2 * | 11/2010 | Canright et al. | 707/709 |
| 7,912,813 B2 * | 3/2011 | Rajaraman et al. | 707/634 |
| 2007/0282470 A1 * | 12/2007 | Hernandez et al. | 700/90 |
| 2008/0005143 A1 * | 1/2008 | Ayachitula et al. | 707/101 |
| 2009/0019046 A1 * | 1/2009 | Coley et al. | 707/7 |
| 2010/0131315 A1 * | 5/2010 | Gilbert et al. | 705/7 |
| 2010/0185658 A1 * | 7/2010 | Kowalski | 707/769 |
| 2010/0191555 A1 * | 7/2010 | Shmul | 705/7 |
| 2010/0251379 A1 * | 9/2010 | Myers et al. | 726/26 |
| 2010/0306275 A1 * | 12/2010 | Maheshwari et al. | 707/803 |
| 2011/0012902 A1 * | 1/2011 | Rajagopalan et al. | 345/440 |

* cited by examiner

*Primary Examiner* — John E Breene
*Assistant Examiner* — Evan Aspinwall (57) ABSTRACT

Systems, methods, and other embodiments associated with graph searching are described. One example method includes selecting a first engine for searching a graph for instances of a pre-specified sub-graph. The example method may also include controlling execution of a search for the pre-specified sub-graph using the first engine. The example method may also include storing performance data describing a performance indicator of the search.

16 Claims, 5 Drawing Sheets

GRAPH SEARCHING

BACKGROUND

Some companies use directed graphs to model information technology (IT) infrastructures that are important to the company. As a company gets larger, the company's IT infrastructure may also expand, making a graph modeling the infrastructure more difficult to search. For example, a network administrator may desire to know which of their company's web applications interact with databases. For a small infrastructure, it may be possible for the administrator to recite the list from memory. However, for companies spanning multiple cities, states, and even countries, it may be next to impossible for a person to manually keep track of the entire list of applications, let alone quickly determine which ones interact with databases. Thus, some companies maintain and/or access IT infrastructure relationship data by running search queries over a graph model of the IT infrastructure.

Some conventional graph searching techniques may use heuristics to determine how to most efficiently run a topological search. For example, some techniques include analyzing the ratio of nodes in the graph to the number of edges in the graph to determine whether a topology traversal or a database query is an efficient first step in returning a list of sub-graphs that match a search query. Other techniques may look at information associated with individual nodes and/or edges specifically. However, it may be difficult for heuristics based approaches to select efficient engines for searching different graphs using different queries.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Systems and methods associated with graph searching are described. One example method includes selecting a first engine for searching a graph for instances of a pre-specified sub-graph. The first engine may be selected as a function of graph-level information associated with the graph and/or the pre-specified sub-graph. The example method also includes causing execution of a search using the first engine. The example method also includes storing performance data associated with the search.

The performance data may indicate, for example, how much memory the search used and/or how fast the search ran. Thus, the performance data may facilitate selecting a different engine for a subsequent search if the performance data indicates that the memory usage and/or runtime of the search exceeded predefined thresholds. The performance data may serve as training data for selecting potentially better engines for subsequently searching graphs when a previous search used an inefficient engine. Thus, the stored performance data may facilitate machine learning for graph searching.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable medium", as used herein, refers to a storage medium that stores instructions and/or data, and is non-transitory. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), an optical medium, a random access memory (RAM), a read only memory (ROM), a memory chip or card, a memory stick, and other media from which a computer, a processor or other electronic device can read.

In some examples, "database" is used to refer to a table. In other examples, "database" may be used to refer to a set of tables. In still other examples, "database" may refer to a set of data stores and methods for accessing and/or manipulating those data stores.

"Data store", as used herein, refers to a physical and/or logical entity that can store data. A data store may be, for example, a database, a table, a file, a list, a queue, a heap, a memory, a register, and so on. In different examples, a data store may reside in one logical and/or physical entity and/or may be distributed between two or more logical and/or physical entities.

"Logic", as used herein, includes but is not limited to hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

"Query", as used herein, refers to a semantic construction that facilitates gathering and processing information. A query may be formulated in a database query language, an object query language (OQL), a natural language, and so on.

"Software", as used herein, includes but is not limited to, one or more executable stored instructions that cause a computer, processor, or other electronic device to perform functions, actions and/or behave in a desired manner.

"Software" does not refer to stored instructions being claimed as a program listing. The instructions may be embodied in various forms including routines, algorithms, modules, methods, threads, and/or programs including separate applications or code from dynamically linked libraries.

"User", as used herein, includes but is not limited to one or more persons, software, computers or other devices, or combinations of these.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. The physical manipulations create a concrete, tangible, useful, real-world result.

It has proven convenient at times, principally for reasons of common usage, to refer to these physical quantities as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, determining, and so on, refer to actions and processes of a computer system, logic, processor, or similar electronic device that manipulates and transforms data represented as physical (electronic) quantities.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

Figure 1:
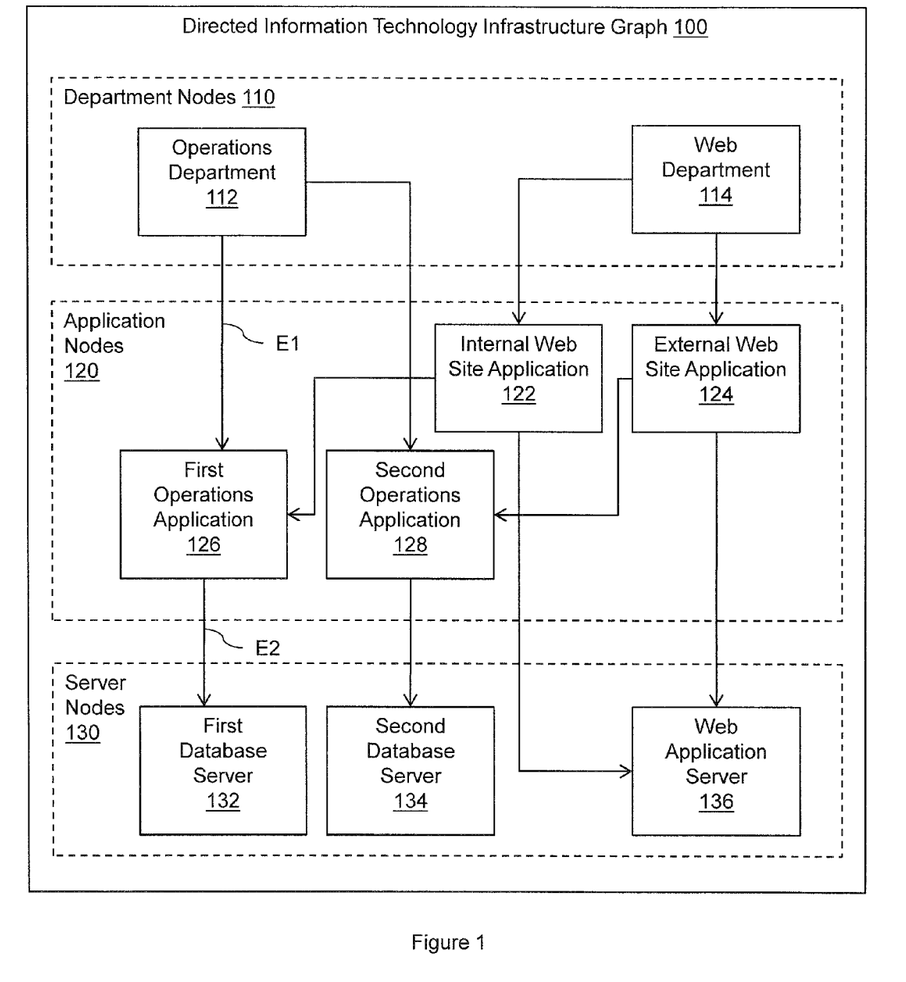
FIG. 1 illustrates an embodiment of an example directed information technology infrastructure graph.
Figure 2:
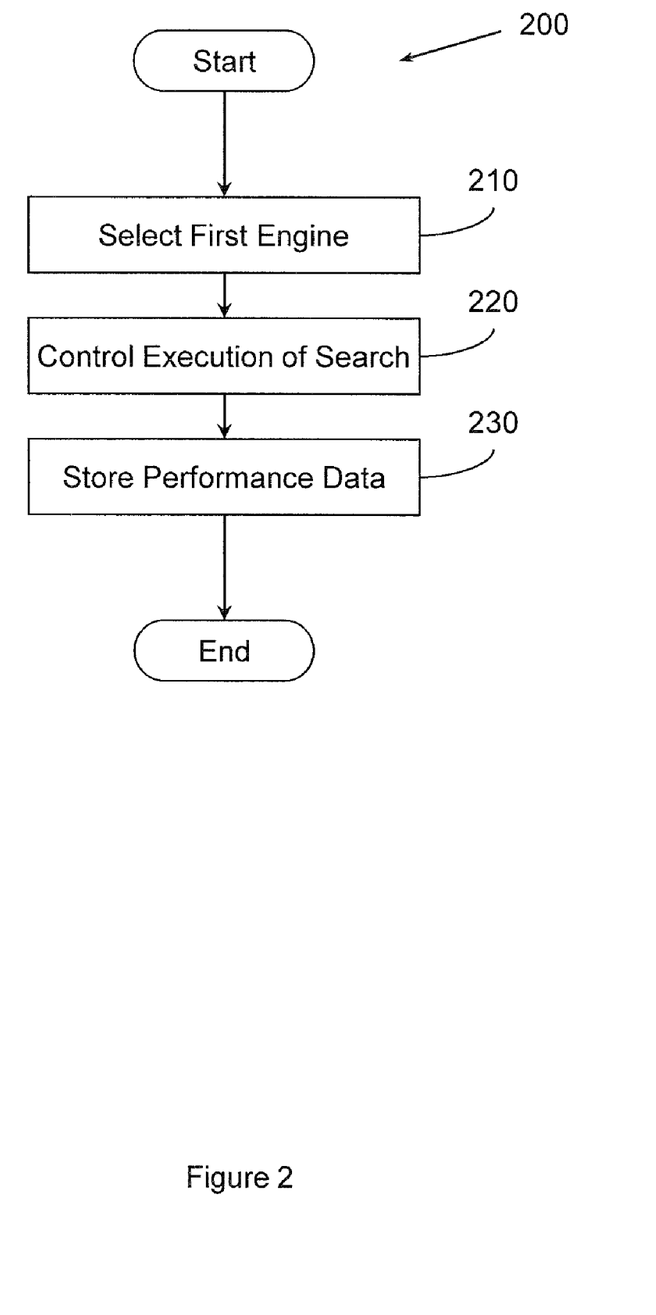
FIG. 2 illustrates an embodiment of a method associated with graph searching.

FIG. 2 illustrates a method 200 associated with graph searching. In one example, method 200 may be applied to a graph similar to directed graph 100 (see FIG. 1), which is discussed below. At 210, method 200 includes selecting a first engine for searching a graph for instances of a pre-specified sub-graph. An engine may be, for example, a process, a logic, a technique, an application specific integrated circuit (ASIC), a card (e.g., a peripheral component interconnect express (PCIE) card), a set of computer executable instructions stored on a computer-readable medium, a computer, a server, a device, a chipset, and so on. The first engine may be selected as a function of graph-level information associated with one or more of the graph and the pre-specified sub-graph. In one example, the nodes in the graph may represent elements of an information technology (IT) infrastructure. Elements of an IT infrastructure may include, for example, computers, tasks, services, databases, servers, corporate hierarchy labels, applications, users, routers, switches, and so on. Edges in the graph may represent relationships between elements of the IT infrastructure. For example, in an undirected graph, an edge may represent that two pieces of an IT infrastructure are connected (e.g., a computer connected to a router). In a directed graph, an edge may represent how components of an IT infrastructure interact with one another (e.g., an application relying on data from a database, a department responsible for maintaining a webpage). While an example involving an IT infrastructure is described, method 200 may be applicable to graphs associated with other types of information (e.g., bioinformatics data, map data).

"Graph-level information", as used herein, refers to information that is static with respect to an entity that selects the first engine at 210. While the graph-level information is described as static, the graph-level information may change over time as a result of changes to the graph. However, when the entity selects the first engine, the entity examines the graph for graph-level information and selects the first engine based on the current graph-level information. Guiding information that guides the selection would not be considered graph-level information as the guiding information is associated with the entity selecting the engine. By way of illustration, a logic may use a heuristic to select a first engine at 210. The heuristic may compare the number of edges in a graph to the number of nodes in the graph. In this example, the number of edges in the graph and the number of nodes in the graph are pieces of graph-level information and the heuristic is considered guiding information. A person having ordinary skill in the art will recognize that there may be other pieces of graph-level information and/or guiding information than those explicitly described that may facilitate selecting a first engine for searching a graph.

FIG. 1 shows an example directed graph 100 of relationships between entities in a portion of an example company's IT infrastructure. The graph 100 includes several application nodes 120 (e.g., internal web site application node 122, external web site application node 124, first operations application node 126, second operations application node 128) that may represent applications and/or computers on which the applications are operating. The graph 100 also includes several server nodes 130 (e.g., first database server node 132, second database server node 134, web application server node 136) that may represent servers. The graph 100 also includes several department nodes 110 (e.g., operations department node 112, web department node 114) that may correspond to departments that are responsible for maintaining entities associated with application nodes 120 and/or server nodes 130. Thus, a node in an IT infrastructure graph may not necessarily be tied to a specific tangible item and may, for example, facilitate illustrating relationships between the IT infrastructure and a company's corporate structure. Furthermore, while several nodes and edges are shown in the graph 100, a person having ordinary skill in the art will recognize that this may not be an exhaustive list of nodes and edges, and that the categories of what nodes represent are merely chosen for example purposes and that other organizational schema may be applicable.

In this example, the directed edges in the graph are represented by arrows and illustrate relationships between components of the IT infrastructure. For example, a first edge E1 connecting the operations department node 112 to the first operations application node 126 may represent the fact that the operations department of the company is responsible for managing a first operations application. A second edge E2 connecting the first operations application node 126 to the first database server node 132 may represent the fact that the first operations application relies on data from a first database server. While a directed graph is shown, a person having ordinary skill in the art will recognize that an undirected graph or a graph using some other organization scheme may also be used to represent a company's IT infrastructure.

Selecting an engine for searching the graph 100 for a pre-specified sub-graph may include extracting graph-level information from the graph 100. In this example, graph-level information may include the number of edges in the graph 100, what type(s) of nodes are in the pre-specified sub-graph (e.g., department nodes, application nodes, server nodes), the number of nodes in the pre-specified sub-graph, the number of edges in the pre-specified sub-graph, and so on. A heuristic or some other piece of guiding information may be applied to the graph-level information to select the engine.

At 220, method 200 includes controlling execution of a search for the pre-specified sub-graph using the first engine. In execution, the first engine may perform an action associated with the graph for finding instances of the pre-specified sub-graph. For example, the action may be a database query or a federated database query. A federated database query is a query or series of queries that is sent to several databases simultaneously. In another example, the action may be a topological search of the graph.

A search of the graph 100 for operations applications that make use of databases may return results that identify a sub-graph containing the first operations application node 126 connected to the first database server node 132 and a sub-graph containing the second operations application node 128 and the second database server node 134.

At 230, method 200 includes storing performance data describing a performance indicator of the search. The performance indicator may describe a run time of the search, a memory usage of the search, and so on. The performance data may be associated with the pre-specified sub-graph and/or the first engine.

Thus, while the search of the graph 100 is executing, performance data may be stored. In one example, this performance data may facilitate guiding future searches of the graph 100. Consider an example of the graph 100 where the operations department node 112 is connected via paths of edges to all database server nodes, including several that are not shown in FIG. 1, either directly or indirectly through other nodes. A heuristic may use this fact to determine that a topological traversal of the directed graph 100 starting from the operations department node 112 is the best first engine for finding instances of operations application nodes that are connected to database server nodes. However, if there are many database server nodes but only a relatively small number of operations application nodes, this engine may be inefficient as the topological traversal may examine nodes in at least all paths from the operations department to database server nodes. This may result in a long and/or memory intensive search that could be improved upon for future searches of the directed graph 100.

While FIG. 2 illustrates various actions occurring in serial, it is to be appreciated that various actions illustrated in FIG. 2 could occur substantially in parallel. By way of illustration, a first process could select a first engine, a second process could control execution of a search, and a third process could store performance data. While three processes are described, it is to be appreciated that a greater and/or lesser number of processes could be employed and that lightweight processes, regular processes, threads, and other approaches could be employed.

In one example, a method may be implemented as computer executable instructions. Thus, in one example, a computer-readable medium may store computer executable instructions that if executed by a machine (e.g., processor) cause the machine to perform a method. While executable instructions associated with the above method are described as being stored on a computer-readable medium, it is to be appreciated that executable instructions associated with other example methods described herein may also be stored on a computer-readable medium.

Figure 3:
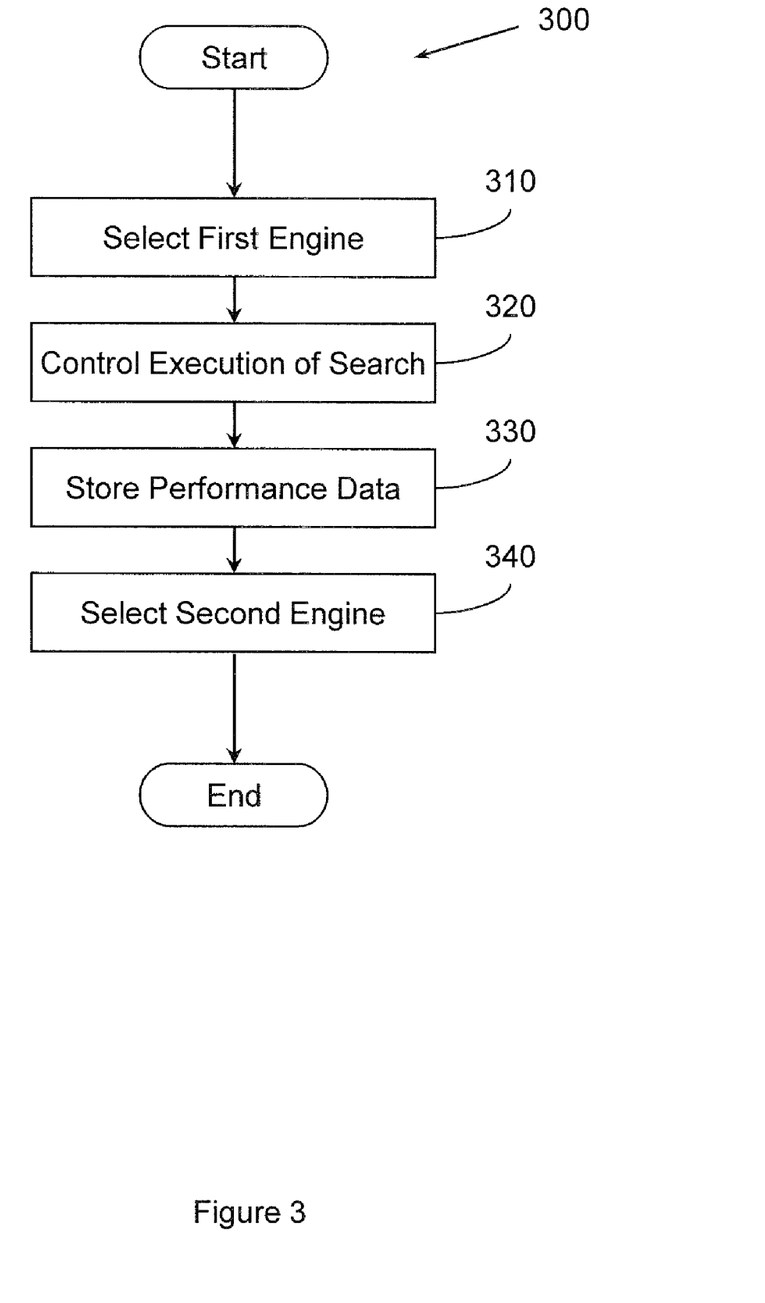
FIG. 3 illustrates another embodiment of a method associated with graph searching.

FIG. 3 illustrates a method 300 associated with graph searching. FIG. 3 includes several actions similar to those described in reference to method 200 (FIG. 2). For example, method 300 includes selecting a first engine for searching a graph for instances of a pre-specified sub-graph at 310, controlling execution of a search at 320, and storing performance data at 330. However, method 300 includes an additional action. At 340, method 300 includes selecting a second engine for searching the graph. The second engine may be selected as a function of performance data in addition to graph-level data. Thus, the performance data serves as guiding data. If the performance data indicates that the first engine selected performed adequately (e.g., fast enough according to a predefined threshold), the second engine may be the same engine as the first engine. In one example, the second engine may be selected for searching for instances of the pre-specified sub-graph. In this example, the graph-level data may be associated with the graph and/or the pre-specified sub graph. In another example, the second engine may be selected for searching for instances of a similar sub-graph that shares an attribute with the pre-specified sub-graph. The attribute may be, for example, a node, a relationship, a shape of a graph, a piece of data associated with a node, a piece of data associated with an edge, and so on. In this example, the graph-level information may be associated with the graph, the pre-specified sub-graph and/or the similar sub-graph.

By way of illustration, a second search for operations application nodes that are connected to database server nodes may result in a selection of a second engine for searching the directed graph 100. The engine may be selected based both on graph-level information as well as on performance data stored during the first search. In one example, the second engine may be a database query for operations application nodes. This may limit a subsequent topological search to only interacting with operations application nodes, thereby reducing the length of the topological search and saving time and/or memory. In this example, the performance data has guided the selection of the second engine which may result in faster and/or less memory intensive execution of the second search than if the first engine had been used again.

Figure 4:
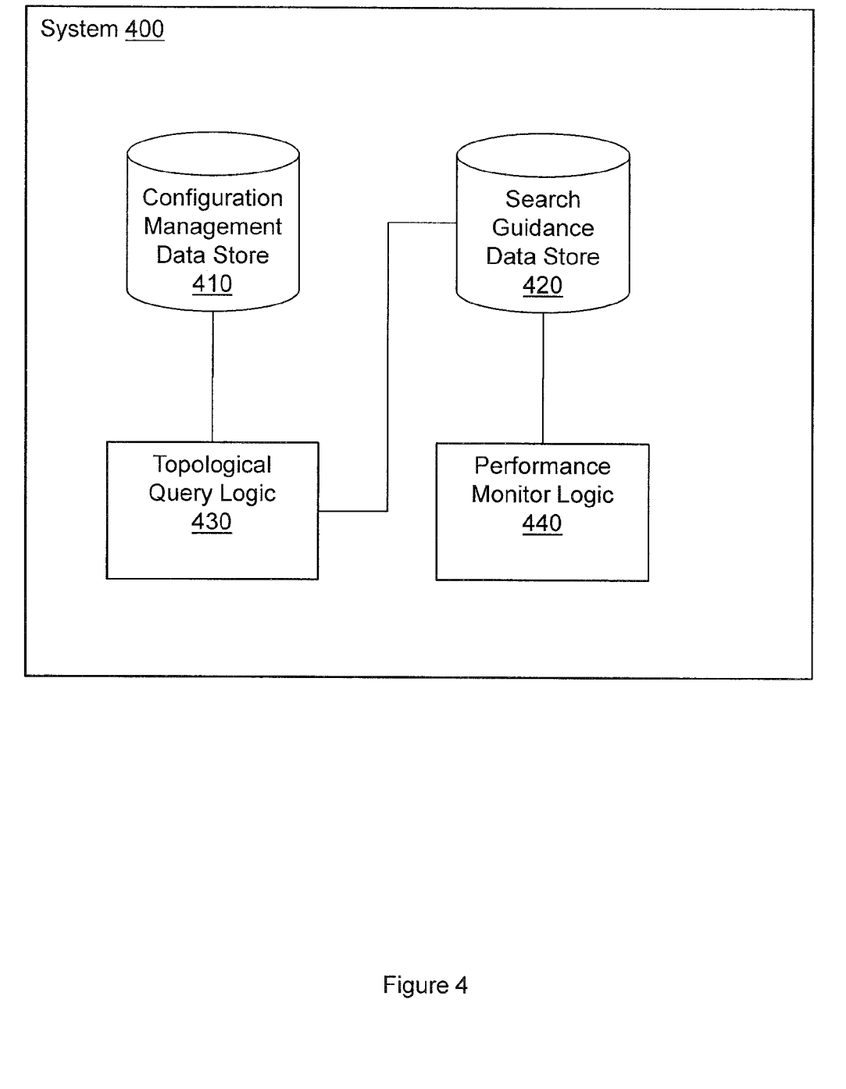
FIG. 4 illustrates one embodiment of a system associated with graph searching.

FIG. 4 illustrates a system 400 associated with graph searching. System 400 includes a configuration management data store (CMDB) 410. The CMDB 410 may be a database. The CMDB 410 stores descriptions of components of an information technology (IT) infrastructure and a directed graph describing relationships between the components of the IT infrastructure. Nodes in the directed graph may represent the components of the IT infrastructure. Components of the IT infrastructure may include, for example, computers, tasks performed by computers, services performed by computers, databases, servers, corporate hierarchy labels, applications, users, routers, switches, and so on. Edges in the directed graph may represent relationships between the components of the IT infrastructure.

System 400 also includes a search guidance data store 420. The search guidance data store 420 stores performance estimates for CMDB searches run by search logics. System 400 also includes a topological query logic 430. The topological query logic 430 selects a search logic for executing a CMDB search. The search logic may be selected as a function of data in the CMDB 410 and performance estimates from the search guidance data store 420. The topological query logic 430 also controls the search logic to execute the CMDB search. The search logic may provide a result of a topological search. The result may be a list of sub-graphs of the directed graph in the CMDB 410. For example, a query for web applications that rely on embedded video may return a first sub-graph with a node associated with an internal website linked to a node associated with an internal training video, and may also return a second sub-graph with a node associated with an external website linked to a node associated a product demonstration video. In one example, system 400 may include the search logic (not shown).

System 400 also includes a performance monitor logic 440. The performance monitor logic 440 monitors performance of the search logic while the CMDB search is executing. The performance monitor logic 440 also stores a performance estimate in the search guidance data store 420. The performance estimate is generated based on the monitoring of the search logic by performance monitor logic 440. The performance estimate may describe, for example, a memory usage of the search logic executing the CMDB, a time to execute the CMDB search by the search logic, and so on.

Thus, system 400 may facilitate machine learning for graph searching. By storing data describing performance of previous searches, system 400 effectively teaches itself what types of search logics efficiently handle queries on the graph stored in the CMDB 410. Even if the topological query logic 430 takes several iterations to select an efficient search logic, the search guidance data 420 will be acquiring guiding data that will eventually lead to an efficient search. This is a state that conventional, heuristics based, approaches may not reach, as conventional approaches may continue to use the same search heuristic repeatedly.

Figure 5:
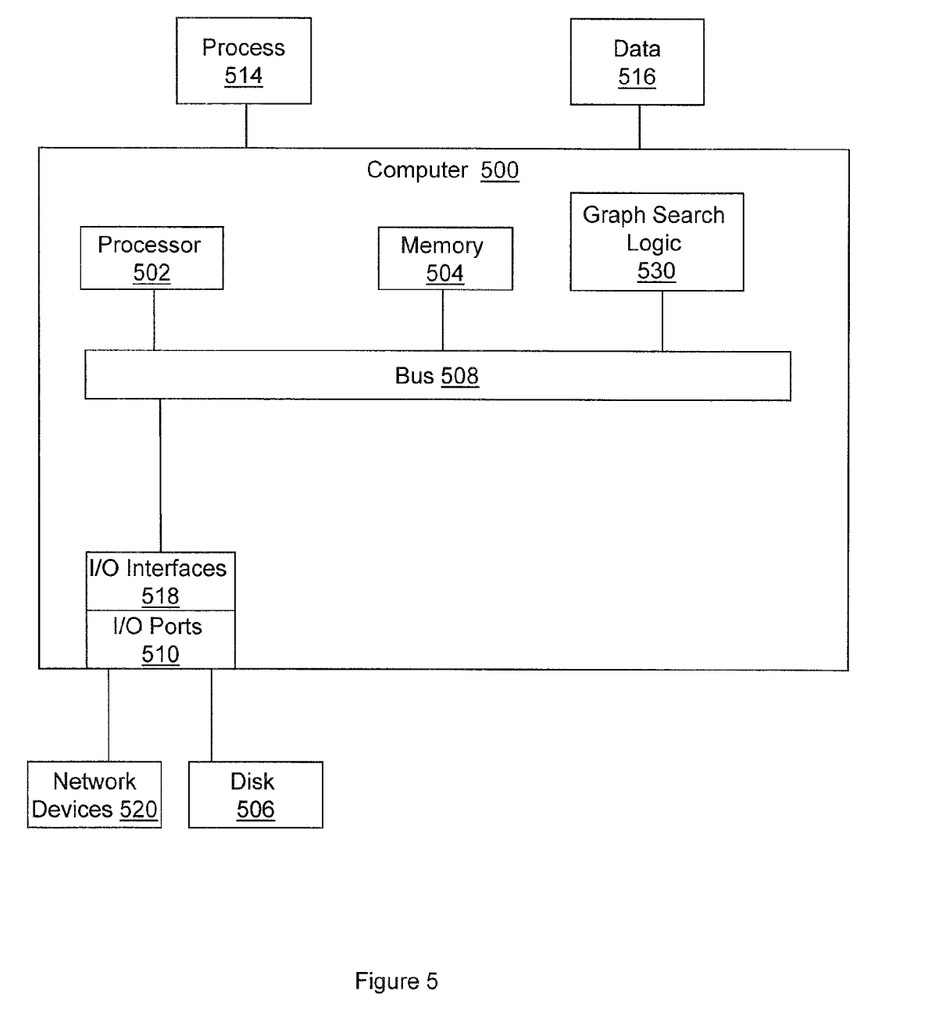
FIG. 5 illustrates one embodiment of an example computing environment in which example systems and methods, and equivalents, may operate.

FIG. 5 illustrates an example computing device in which example systems and methods described herein, and equivalents, may operate. The example computing device may be a computer 500 that includes a processor 502, a memory 504, and input/output ports 510 operably connected by a bus 508. In one example, the computer 500 may include a graph search logic 530 configured to facilitate running topological queries on a graph representing an information technology infrastructure. In different examples, the graph search logic 530 may be implemented in hardware, software, firmware, and/or combinations thereof. While the graph search logic 530 is illustrated as a hardware component attached to the bus 508, it is to be appreciated that in one example, the graph search logic 530 could be implemented in the processor 502.

The graph search logic 530 may provide means (e.g., hardware, software, firmware) for selecting a calculation strategy for executing a topological query on a graph. The calculation strategy may be selected as a function of data describing one or more of, the topological query, the graph, and performance data associated with a calculation strategy chosen in a previous execution of the topological query. The means may be implemented, for example, as an ASIC. The means may also be implemented as computer executable instructions that are presented to computer 500 as data 516 that are temporarily stored in memory 504 and then executed by processor 502. The graph search logic 530 may also provide means (e.g., hardware, software, firmware) for storing performance data acquired by monitoring execution of the topological query.

Generally describing an example configuration of the computer 500, the processor 502 may be a variety of various processors including dual microprocessor and other multi-processor architectures. A memory 504 may include volatile memory (e.g., a RAM) and/or non-volatile memory (e.g., a ROM).

A disk 506 may be operably connected to the computer 500 via, for example, an input/output interface (e.g., card, device) 518 and an input/output port 510. The disk 506 may be, for example, a magnetic disk drive, a solid state disk drive, a floppy disk drive, a tape drive, a Zip drive, a flash memory card, a memory stick, an optical disk (e.g., a compact disk), and so on. The memory 504 can store a process 514 and/or a data 516, for example. The disk 506 and/or the memory 504 can store an operating system that controls and allocates resources of the computer 500.

The bus 508 may be a single internal bus interconnect architecture and/or other bus or mesh architectures. While a single bus is illustrated, it is to be appreciated that the computer 500 may communicate with various devices, logics, and peripherals using other busses (e.g., peripheral component internet express (PCIE), 1394, universal serial bus (USB), Ethernet). The bus 508 can be types including, for example, a memory bus, a memory controller, a peripheral bus, an external bus, a crossbar switch, and/or a local bus.

The computer 500 may interact with input/output devices via the i/o interfaces 518 and the input/output ports 510. Input/output devices may be, for example, a keyboard, a microphone, a pointing and selection device, cameras, video cards, displays, the disk 506, the network devices 520, and so on. The input/output ports 510 may include, for example, serial ports, parallel ports, and USB ports.

The computer 500 can operate in a network environment and thus may be connected to the network devices 520 via the i/o interfaces 518, and/or the i/o ports 510. Through the network devices 520, the computer 500 may interact with a network. Through the network, the computer 500 may be logically connected to remote computers. Networks with which the computer 500 may interact include, but are not limited to, a local area network (LAN), a wide area network (WAN), and other networks.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A computer-readable medium storing computer-executable instructions that when executed by a computer cause the computer to perform a method, the method comprising:
    selecting a first engine for searching a graph for instances of a pre-specified sub-graph, where the first engine is selected as a function of graph-level information associated with one or more of the graph and the pre-specified sub-graph, the graph describing relationships among a plurality of components of an information technology (IT) infrastructure having descriptions that are stored within a configuration management data store (CMDB);
    selecting a second engine for searching the graph for instances of the pre-specified sub-graph, where the second engine is selected as a function of performance data and graph-level information associated with one or more of the graph and the pre-specified sub-graph;
    controlling execution of a search for the pre-specified sub-graph using the first engine and the second engine; and
    storing performance data associated with one or more of the pre-specified sub-graph, the first engine, and the second engine describing a performance indicator of the search,
    wherein the first engine and the second engine are different engines,
    wherein each engine is associated with a different way by which the graph is to be searched,
    and wherein both the first engine and the second engine are able to locate the instances of a same pre-specified sub-graph within the graph.

2. The computer-readable medium of claim 1, the method comprising selecting a second engine for searching the graph for instances of a similar sub-graph that shares an attribute with the pre-specified sub-graph, where the second engine is selected as a function of performance data and graph-level information associated with one or more of, the graph, the pre-specified sub-graph, and the similar sub-graph.

3. The computer-readable medium of claim 1, where the performance indicator describes a run time of the search.

4. The computer-readable medium of claim 1, where the performance indicator describes a memory usage of the search.

5. The computer-readable medium of claim 1, where the first engine performs an action associated with the graph for finding the instances of the pre-specified sub-graph.

6. The computer-readable medium of claim 5, where the action is a database query.

7. The computer-readable medium of claim 6, where the action is a federated database query.

8. The computer-readable medium of claim 5, where the action is a topological search of the graph.

9. The computer-readable medium of claim 1, where the engine is one of, a process, a logic, an application specific integrated circuit, a card, a set of computer-executable instructions stored on a computer-readable medium, a computer, a server, and a device.

10. A system, comprising:
    a configuration management data store (CMDB) to store descriptions of components of an information technology (IT) infrastructure and to store a directed graph describing relationships between the components of the IT infrastructure;
    a search guidance data store to store performance estimates for CMDB searches run by search logics;
    a topological query logic to select a first search logic for executing a CMDB search as a function of data in the CMDB and performance estimates from the search guidance data store, to select a second search logic for executing the CMDB search as a function of performance and the graph-level information associated with one or more of the graph and a pre-specified sub-graph, and to control the first search logic and the second search logic to execute the CMDB search; and
    a performance monitor logic to monitor performance of the first search logic and the second search logic while the CMDB search is executing and to store a performance estimate in the search guidance data store,
    wherein the first search logic and the second search logic are different search logic,
    wherein each search logic is associated with a different way by which the graph is to be searched,
    and wherein both the first search logic and the second search logic are able to locate the instances of a same pre-specified sub-graph within the graph.

11. The system of claim 10, comprising the first search logic and the second search logic, and where each of the first search logic and the second search logic provides a result of a topological search.

12. The system of claim 10, where nodes in the directed graph represent the components of the IT infrastructure.

13. The system of claim 12, where the components of the IT infrastructure comprise one or more of, computers, tasks performed by computers, services performed by computers, databases, servers, corporate hierarchy labels, applications, users, routers, and switches.

14. The system of claim 12, where edges in the directed graph represent relationships between the components of the IT infrastructure.

15. The system of claim 10, where the performance estimate describes a memory usage of the first search logic and the second search logic executing the CMDB.

16. The system of claim 10, where the performance estimate represents a time to execute the CMDB search by the first search logic and the second search logic.

* * * * *